Jan. 10, 1967  H. BLAZEK  3,296,871

SYNCHRONOUS ROTATING PENDULUM ACCELEROMETER

Filed Feb. 19, 1964

INVENTOR.
HENRY BLAZEK
BY Raymond R. Skolnick

United States Patent Office 3,296,871
Patented Jan. 10, 1967

3,296,871
SYNCHRONOUS ROTATING PENDULUM
ACCELEROMETER
Henry Blazek, Nyack, N.Y., assignor to Sperry Rand Corporation, Ford Instrument Company Division, a corporation of Delaware
Filed Feb. 19, 1964, Ser. No. 346,041
3 Claims. (Cl. 73—517)

This invention relates to accelerometers in general and is, more particularly, related to an improvement in the rotating pendulum accelerometer disclosed in U.S. Patent No. 2,936,624, issued May 17, 1960, to S. Schalkowsky et al.

The accelerometer disclosed in the aforesaid Patent 2,936,624 operates on the principle that acceleration forces acting transverse to the rotational axis of a rotating unbalanced cylinder will cause cylinder rotation to be modulated during each period of rotation. Since the modulation is sinusoidal and occurs in a predictable manner for a given speed of cylinder rotation, by feeding information related to the period of rotation and the time difference during successive half periods of rotation to a computer, an output indicative of acceleration may be obtained.

In the device of the aforesaid Patent 2,936,624, the unbalanced cylinder sensor was supported by an air bearing means. Rotation was imparted by so-called turbine torque or torques about the axis of the sensor resulting from the unsymmetrical transfer momentum from the air film to the rotating cylinder. Since the unsymmetrical transfer of momentum from the air film is not readily controllable and is subject to change, the period of sensor rotation is not readily controlled. Hence, it is necessary for the computing apparatus to handle two variables in order to produce an output related to acceleration. That is, the computer must operate upon a signal related to half cycle time difference as well as a signal related to sensor rotational period.

The instant invention simplifies construction of a rotating unbalanced cylinder accelerometer by providing means for controlling the average period of rotation. By controlling the average speed of sensor rotation, the computing apparatus is greatly simplified in that only a single variable, namely half cycle time difference, need be handled by the computer.

Average speed of sensor rotation is controlled by providing a synchronous motor which acts through a flexible coupling to drive the sensor. A clock means is provided to control the frequency of the source energizing the synchronous motor thereby assuring a controlled motor speed.

The flexible coupling enables the sensor to have the same average rotational speed as the synchronous motor. However, within each cycle the sensor is permitted to speed up and slow down responsive to applied forces acting transverse to the rotational axis of the sensor.

Accordingly, a primary object of the instant invention is to provide a novel construction for a roating unbalanced cylinder accelerometer.

Another object is to provide an accelerometer of this type in which the computer circuitry is greatly simplified.

Still another object is to provide an accelerometer of this type in which means are provided for closely controlling the average period of rotation of the sensor.

A further object is to provide an accelerometer of this type in which the sensor is rotated by a constant speed device acting through a flexible coupling.

These objects, as well as other objects of this invention will become apparent after reading the following description of the accompanying drawings in which.

Figure 1:
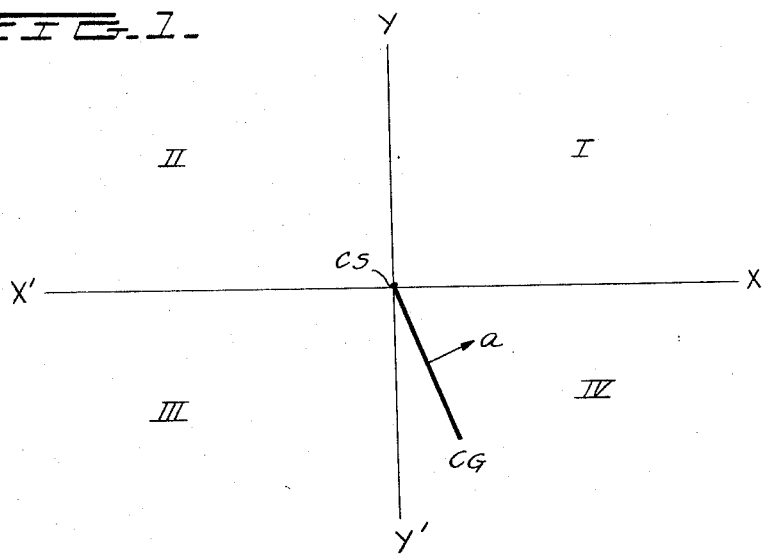
FIGURE 1 is a diagram of an idealized synchronous rotating pendulum accelerometer.
Figure 2:
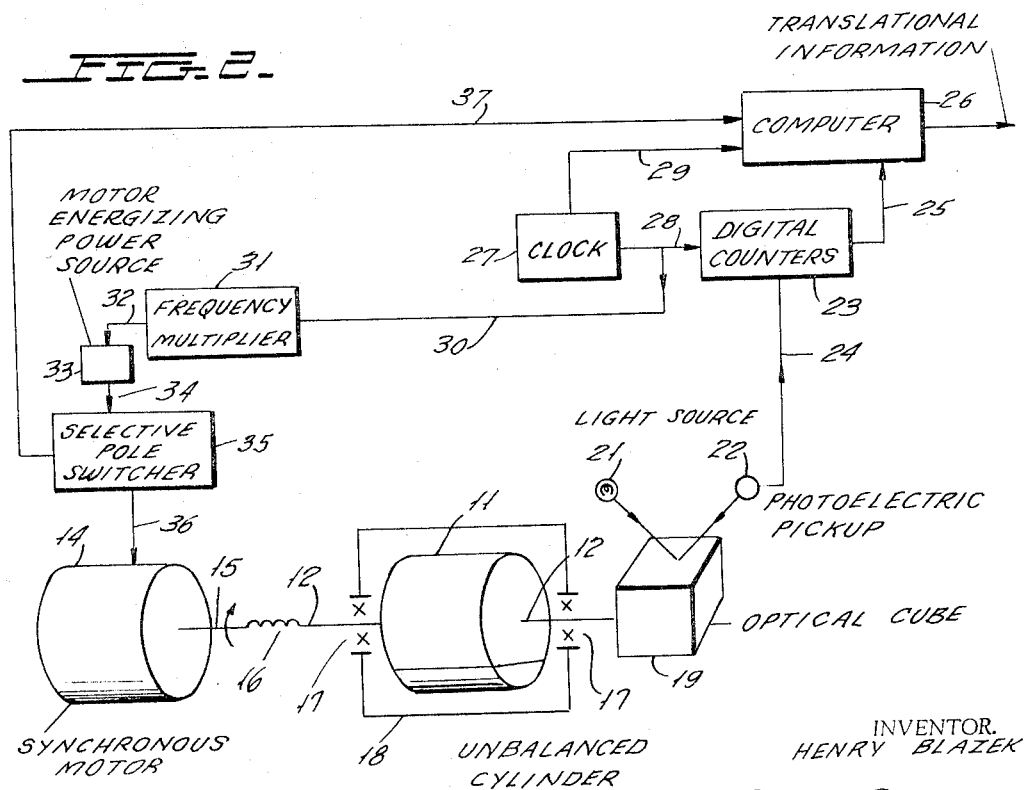
FIGURE 2 is a combined schematic and block diagram of a synchronous rotating pendulum accelerometer.

Now referring to the figures and more particularly to FIGURE 1. The center of support CS of the sensor or unbalanced cylinder 11 (FIGURE 2) is located at the center of the X—Y coordinates and coincides with cylinder shaft 12 (FIGURE 2). The sensor center of gravity CG rotates at an angular velocity W about the axis defined by the center of support CS. Acceleration components of cylinder 11 along the X and Y axis are closely approximated by the following equations:

$$a_{Y'Y} = \left(\frac{2\pi^3 g_E}{W_P{}^2}\right)\frac{\Delta t_1}{T^3}$$

$$a_{X'X} = \left(\frac{2\pi^3 q_E}{W_P{}^2}\right)\frac{\Delta t_2}{T^3}$$

where $a_{Y'Y}$=Acceleration component along axis Y'Y
$a_{X'X}$=Acceleration component along axis X'X
$W_P$=Natural radian frequency of pendulum when oscillating through small angles in the earth's gravitation field ($g_E$)
$g_E$=Earth's gravitation field where accelerometer is calibrated
$\Delta t_1$=Time for cylinder to transverse quadrants I and II minus time for cylinder to traverse quadrants III and IV
$\Delta t_2$=Time for cylinder to traverse quadrants IV and I minus time to traverse quadrants II and III
$T$=Period of rotation Obviously the solution of the equations for the acceleration components is greatly simplified by making the period $T$ equal to a known constant thereby eliminating the circuitry required to compute and divide by the term $T^3$.

This is accomplished by providing synchronous motor 14 (FIGURE 2) whose output shaft 15 is connected to one end of sensor shaft 12 through flexible coupling 16. Shaft 12 is mounted for rotation in axially spaced bearings 17 fixed to the accelerometer frame 18. The other end of shaft 12 carries optical cube 19 positioned to reflect light from source 21 to photoelectric pickup 22 four times for each revolution of sensor 11. Pickup 22, in turn, transmits four pulses to digital counters 23 over line 24 for each revolution of sensor 11. As fully explained in the aforesaid Patent 2,936,624, counters 23 add pulses generated by pickup 22 during one half revolution of sensor 11 then, for the next half revolution subtract pulses generated by pickup 22 thereby producing output $\Delta t$ which is transmitted over line 25 to computer 26.

Gating signals generated by electronic clock 27, and transmitted over line 28 to counters 23, signify the beginning and end of each half revolution. Signals from clock 27 are transmitted directly to computer 26 over line 29 and are transmitted over line 30 to frequency multiplier 31. The latter acts to count down the frequency of the signal generated by clock 27.

This produces a sub-multiple of the clock signal frequency. This sub-multiple frequency signal as fed over line 32 to motor energizing power source 33. The output of power source 33 is fed over line 34 to selective pole switcher 35 which is connected through cable 36 to the field windings of synchronous motor 36. Line 37 provides an operative connection between pole switcher 35 and computer 26.

Selective pole switcher 35 is provided so that with a given frequency output from multiplier 31 the rotational speed of synchronous motor 14 can be varied in discrete steps by selecting the number of magnetic poles provided by the structure of motor 14. This enables the dynamic range of measurement to be shifted to a different portion of the acceleration spectrum. Motor speed is a design parameter which determines the dynamic range of measurement of the accelerometer.

Flexible coupling 16 forces unbalanced cylinder 11 to have the same average period of rotation as synchronous motor 14. When an acceleration normal to the axis of rotation 12 of sensor 11 exists, this acceleration will produce a torque proportional to the sine of the angle of rotation of sensor 11. This torque modulates the speed of sensor 11 with respect to the constant angular speed of synchronous motor 14 thereby producing the effect required for measurement of acceleration.

It should be apparent to those skilled in the art that the torsional gradient of coupling 16 should be as low as practical to maintain a constant average period of rotation for sensor 11 yet be yieldable enough to offer little opposition to change in cyclic speed variations of sensor 11.

Even though clock 27 and selective pole switcher 35 are both coupled to computer 26, since their outputs are fixed at selected valves computer complexity is substantially unaffected. Essentially, computer 26 is required to handle a single variable $\Delta t$ in order to produce translation information at output line 39.

Thus, it is seen that by constraining an unbalanced cylindrical sensor to rotate at a specified average period of rotation, the overall accelerometer unit is materially simplified principally since less computer circuitry is required to compute acceleration.

Although there has been described a preferred embodiment of this novel invention many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In an accelerometer including an acceleration responsive sensor, first means defining an axis of rotation for said sensor at a position remote from its center of gravity, a synchronous motor for rotating said sensor in one direction about said axis, transducer means for generating signals responsive to variations in angular velocity of said sensor throughout each cycle of revolution thereof, computer means for receiving said signals and adapted to produce an output indicative of translating acceleration of said sensor, a flexible coupling constituting a driving connection between said motor and said sensor, a device controlling operation of said motor such that rotation of said sensor is maintained at a predetermined average speed, said device including an energizing source for said motor and a clock means controlling the output frequency of said source, said clock means generating signals fed to said transducer means and said computer means whereby said signals generated by said transducer means and said output of said computer means are related to said signals generated by said clock means.

2. An accelerometer as in claim 1 in which said transducer means includes a portion mechanically connected to said motor, said portion comprising a single rotatable member rotationally driven by said motor.

3. An accelerometer as in claim 2 in which said flexible coupling is interposed between said motor and said single rotatable member.

References Cited by the Examiner

UNITED STATES PATENTS

| | | | |
|---|---|---|---|
| 2,936,624 | 5/1960 | Scholkowsky et al. | 73—516 |
| 3,178,946 | 4/1965 | Talbot | 73—517 |

RICHARD C. QUEISSER, *Primary Examiner.*

JAMES J. GILL, *Examiner.*